United States Patent [19]
Caskey et al.

[11] Patent Number: 5,179,471
[45] Date of Patent: Jan. 12, 1993

[54] SPECTRALLY SELECTIVE MIRROR AND METHOD FOR MAKING SAME

[75] Inventors: Gregory T. Caskey; Rodney S. Arendsen; Niall R. Lynam, all of Holland, Mich.

[73] Assignee: Donnelly Corporation, Holland, Mich.

[21] Appl. No.: 603,568

[22] Filed: Oct. 25, 1990

[51] Int. Cl.⁵ ............................................ G02B 17/00
[52] U.S. Cl. ................................. 359/603; 359/360; 359/900
[58] Field of Search ............... 359/603, 601, 359, 360, 359/884, 885, 890, 589, 900; 296/97.1, 97.2

[56] References Cited

U.S. PATENT DOCUMENTS

| | | | |
|---|---|---|---|
| 2,427,689 | 9/1947 | Osterberg et al. | 88/39 |
| 2,478,817 | 8/1949 | Gaiser | 88/105 |
| 2,519,722 | 8/1950 | Turner | 88/105 |
| 2,590,906 | 4/1952 | Tripp | 88/110 |
| 2,715,352 | 8/1955 | Jobe | 88/20 |
| 2,750,832 | 6/1956 | Morgan | 88/1 |
| 2,999,034 | 9/1961 | Heidenhain | |
| 3,412,575 | 11/1968 | Feldman et al. | 63/2 |
| 3,556,640 | 1/1971 | Austin | 359/580 |
| 3,559,090 | 1/1971 | Refermat et al. | 359/580 |
| 3,671,286 | 6/1972 | Fischell | 117/333 |
| 3,679,291 | 7/1972 | Apfel et al. | 359/580 |
| 3,834,793 | 9/1974 | McConnell et al. | |
| 4,673,248 | 6/1987 | Taguchi et al. | 359/589 |
| 4,921,331 | 5/1990 | Nakajima | 359/580 |
| 4,955,705 | 9/1990 | Nakajima et al. | 359/884 |

FOREIGN PATENT DOCUMENTS 34360 4/1986 Fed. Rep. of Germany .

OTHER PUBLICATIONS

Appendix A-Photograph of "Blue Mirror" vehicular rearview mirror element on sale in the United States for more than one year by Donnelly Corporation, Holland, Mich.

Primary Examiner—Loha Ben
Attorney, Agent, or Firm—Price, Heneveld, Cooper, DeWitt & Litton

[57] ABSTRACT

A spectrally selective, glare-reducing mirror for vehicles which includes a substrate having a multi-layer coating on one side. The multi-layer coating includes a thin, transparent dielectric layer, preferably of titanium dioxide at a thickness of about 600–650 angstroms, and a very thin layer of metal, preferably of aluminum or silver, at a thickness of between about 25 and 150 angstroms. The dielectric layer is closest to a source of incident light to be reflected by the mirror. When applied to the rear surface of a transparent substrate such as glass, the metal layer may also be coated with light absorbing material such as paint for protection and reduction in unwanted reflections. In the preferred dielectric and metal thicknesses, a blue reflecting mirror results having a glare-reducing luminous reflectance between about 35% and 60%, while costs are reduced due to lesser required amounts of metal than in prior known mirrors.

53 Claims, 7 Drawing Sheets

SPECTRALLY SELECTIVE MIRROR AND METHOD FOR MAKING SAME

FIELD OF THE INVENTION

This invention relates to mirrors and, more particularly, to rearview mirrors for vehicles which are spectrally selective to enhance visibility in predetermined light conditions while having luminous reflectance levels adapted to reduce glare and enhance visibility.

BACKGROUND OF THE INVENTION

Vehicular rearview mirrors, especially for the exterior of an automobile or truck, are broadly classified as either spectrally nonselective, i.e., metallic or silvery in appearance, or spectrally selective, i.e., those which use light interference to enhance reflectance in some portion of the visible wavelength spectrum relative to other portions. For example, a first surface, chromium coated, glass mirror is a spectrally nonselective or metallic appearing mirror. Various types of commercially available, anti-dazzling, glare reducing blue mirrors are exemplary of spectrally selective mirrors.

Spectral selectivity makes the reflectance from the mirror dependent on the light source which projects light incident on the mirror as well as on the detector which senses the reflected light rays. In vehicular applications, the light source of most interest is usually a headlight while the detector is the human eye. The luminous reflectance of rearview mirrors is measured by using a light source which models light from a headlight and by using a detector with a filter which mimics the spectral selectivity of the human eye when in its day-adapted (photopic) mode. Such measurements of luminous reflectance are performed in accordance with SAE (Society of Automotive Engineers) Recommended Practice J964a for measurement of rearview mirror reflectivity. The human eye adapts to various levels of ambient light by changing its sensitivity to various colors. During the day, when light is abundant, human eye sensitivity is highest in the green spectral regions. As the light level drops, however, the peak eye sensitivity moves toward the shorter blue wavelengths. Since headlights have a spectral emission that is strong in longer yellow wavelengths but weak in blue, a glare reducing or anti-dazzling mirror which optimizes low light vision should accentuate reflectance in the blue regions where the eye is most sensitive but reduce reflectance in the yellow regions thereby reducing headlight reflectance. Such a mirror is, therefore, blue in color.

In addition, the optimal vehicular mirror which reduces glare and provides an anti-dazzling effect also has sufficient luminous reflectance to provide an image which is bright enough that the driver can quickly, accurately and easily gather information about the environment even in low light level conditions, but not so bright, i.e. not greater than 60% luminous reflectance or thereabouts, as to act as a source of glare from following headlights at night. Moreover, governmental regulations such as Federal Motor Safety Standard 111 in the United States require a mirror luminous reflectance of at least 35%. Likewise, in Europe, European Economic Community Council Directive 71/127/EEC requires a similar reflectance of at least 40% for mirrors. Thus, it is desirable that a rearview mirror have a luminous reflectance in the 35% to 60% range and that it be spectrally selective with the spectral selectivity being such that the mirror is more strongly reflecting in the blue/green region of the visible spectrum below about 560 nanometers than it is reflecting in the yellow/red region above 560 nanometers so that the mirror has a blue tint as viewed in reflectance.

Beyond headlight glare reduction in the yellow/red spectral regions and enhanced reflectivity of blue light where the human eye is sensitive at night, use of blue mirrors on vehicles has another advantage. Blue is perceived by consumers to be an aesthetically pleasing, relaxing color. Consequently, blue mirrors have found consumer acceptance and approval on vehicles. For all these reasons, spectrally selective blue automotive rearview mirrors of luminous reflectance in the 35% R to 60% R range have been widely used, particularly as exterior mirrors on luxury vehicles.

In order to meet the above objectives, numerous types of spectrally selective blue mirrors have been used in the past. Many prior mirrors, such as those disclosed in U.S. Pat. No. 4,673,248 and West German No. DE 34 360 16 have used relatively thick layers of opaque or near opaque metal having a luminous or bulk reflectance below about 80% such as alloys of nickel/chrome, aluminum/copper, nickel/cobalt, tin/copper or singular metals such as chromium, titanium, zinc or tin. Such metals are typically combined with various other layers, usually including dielectric materials. Metals having high bulk reflectance over 80% such as aluminum or silver in opaque layers have been avoided in spectrally selective rearview mirrors because such mirrors often have poor spectral selectivity. The use of the above-mentioned different alloys or singular metals such as chromium, titanium, zinc or tin which have lower total reflectances is necessary to avoid such loss of spectral selectivity. Hence, such mirrors often require more exotic metals or alloys, thicker metal layers and longer layer coating times resulting in more expensive products. Further, such mirrors have often failed to simultaneously achieve a commercially desirable blue spectral selectivity and maintain at least 35% luminous reflectance and particularly so in constructions where the thin film coatings are located behind, and are protected by, the substrate.

Accordingly, while the value of spectrally selective, blue mirrors has been previously recognized in the vehicular industry, a need has remained for a commercially acceptable, economically produced mirror which simultaneously achieves and combines luminous reflectance meeting minimum safety standards in the U.S.A. or Europe with good glare reduction and appreciable spectral selectivity especially in the blue visible wavelength regions of the spectrum to provide for enhanced low light visibility.

SUMMARY OF THE INVENTION

The present invention provides a solution to the above need with a spectrally selective mirror which simultaneously achieves consumer and regulatory acceptable luminous reflectance with significant spectral selectivity thereby producing a high quality, glare reducing rearview mirror which both enhances low light visibility while meeting minimum reflectance governmental safety standards. The invention achieves this result through the use of a very thin metal layer preferably of a high bulk reflectance metal such as aluminum or silver over or behind a thin dielectric layer on a substrate which may be formed from glass or another material. Minimum governmental reflectance safety standards are met through the use of such highly reflective metals by making the metallic layer sufficiently thin as to be substantially transparent yet reflecting a sufficient amount of the incident light to meet minimum standards. Spectral selectivity is provided through the use of the thin dielectric layer of a thickness sufficient to produce the desired interference, namely, about one-quarter of those wavelengths in the desired visible region of the spectrum, and adjusted so as to maximize reflectance in the blue visible region.

In one form, the invention is a spectrally selective, glare reducing mirror for vehicles comprising a substrate having front and rear surfaces, a multi-layer coating on the substrate including a thin layer of transparent, dielectric material and a very thin layer of metal, at least one of the metal and dielectric layers being applied directly to the substrate. The metal layer has a thickness within the range of between about 25 and 150 angstroms to provide both substantial transparency along with significant reflectivity. The layer of dielectric material is positioned closest to a source of incident light to be reflected by the mirror. Thus, the mirror provides desired luminous reflectance at a level which reduces reflected glare while providing appreciable spectral selectivity in the reflected light.

In other aspects of the invention, the substrate may be transparent with the dielectric layer being applied to the rear substrate surface while the metal layer is applied over the dielectric layer to the rear of the dielectric layer. Thus, and desirably, the multi-layer coating is protected by the substrate from damage due to scratching or abrasion and from direct contact with the outside environment. In this form, a protective coating of light absorbing material such as paint may be applied over the metal layer to uniformly absorb light in all visible wavelengths to reduce extra-mirror imaging (reflectance from objects other than the mirror, i.e., from anything behind the mirror) and provide an environmental barrier which protects the multi-layer coating against moisture, salt and other elements encountered in vehicle driving.

In another form of the invention, the metal layer is applied to the front substrate surface. The dielectric layer is applied over the metal layer in front of the metal layer. In this form, the light absorbing coating may be applied to the rear surface of the substrate if the substrate is transparent. Alternately, the substrate may be made of an opaque material in which case the light absorbing coating is unnecessary.

In a preferred form of the mirror, the metal layer is formed from aluminum having a thickness of between about 80 and 100 angstroms, a light transmittance of between about 22% and 16% and a luminous reflectance of between about 42% and 51%. Likewise, the preferred dielectric layer is titanium dioxide with an index of refraction of about 2.4 and a thickness of about 600 to 650 angstroms. The dielectric layer may also be made from other materials such as tantala and tungsten oxide.

In yet another aspect of the invention, a method for manufacturing a spectrally selective, glare reducing mirror for vehicles is disclosed providing a more commercially efficient, lower cost method. In this case, curved mirrors may be made by providing a sheet of flat glass having front and rear surfaces, coating one surface of the sheet with a thin layer of dielectric material of a desired thickness, heating the coated glass to a temperature sufficient to allow bending of the coated glass, bending the heated, coated glass to a desired curvature, followed by coating the bent, coated glass over the layer of dielectric material with a very thin layer of metal having a thickness within the range of between about 25 and 150 angstroms. Alternatively, the process above can be followed without the bending step to economically produce flat mirrors. Preferably, the thin metal layer may be coated with a layer of light absorbing paint or other material to reduce extra-mirror imaging and form a protective barrier against environmental effects.

Accordingly, the present invention provides a unique spectrally selective, glare reducing mirror especially useful in vehicular applications by incorporating a high bulk reflectance metal in a layer sufficiently thin as to be significantly transparent while sufficiently reflective to meet known standards. The metal layer is significantly thinner than prior known metal layers in spectrally selective mirrors. Moreover, the present construction provides sufficient minimal luminous reflectance to meet known governmental standards while reducing material usage and coating time which results in reduced costs and increased production efficiency and, therefore, a more economical product. Moreover, the invention allows use of more common, less expensive metals such as aluminum as compared to exotic, more expensive alloys. Further, a unique method is provided which produces a high quality, uniformly coated, curved or flat mirror without sacrificing vision quality.

These and other objects, advantages, purposes and features of the invention will become more apparent from a study of the following description taken in conjunction with the drawings.

DESCRIPTION OF THE PREFERRED EMBODIMENTS AND METHOD

Figure 1:
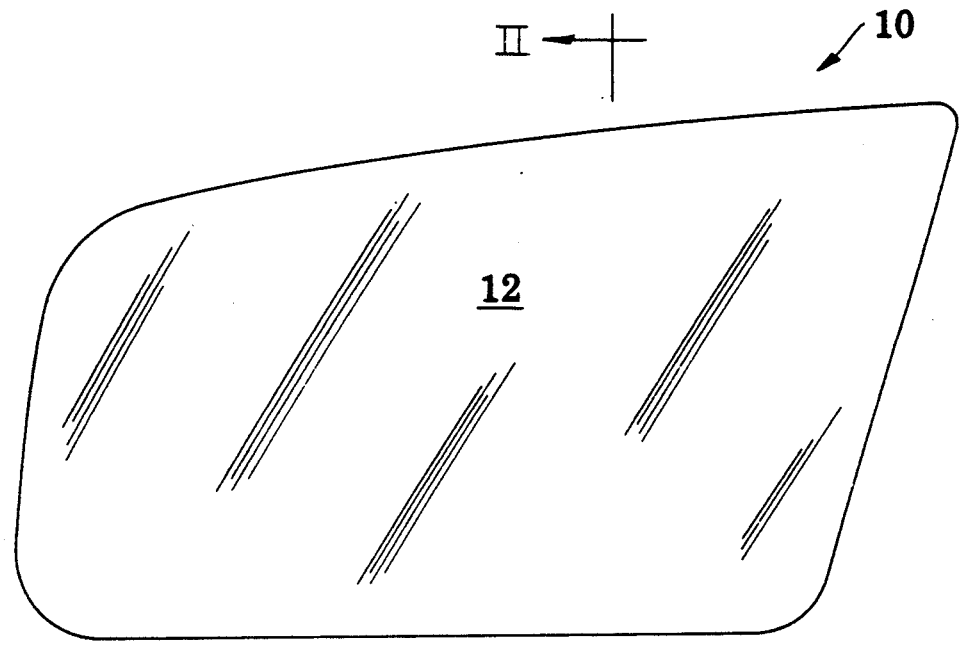
FIG. 1 is a front view of one form of the spectrally selective, glare reducing mirror of the present invention.
Figure 2:
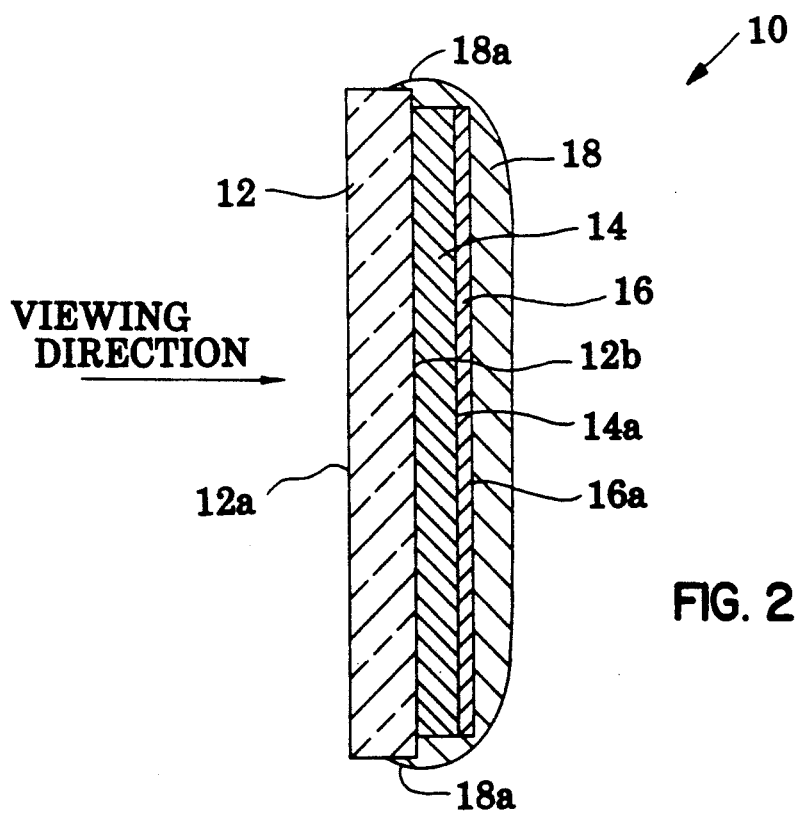
FIG. 2 is a sectional view of the mirror of FIG. 1 taken along plane II—II.

Referring now to the drawings in greater detail, FIGS. 1 and 2 illustrate a first embodiment 10 of the spectrally selective, glare reducing mirror of the present invention adapted for use as an exterior, rearview vehicular mirror. Mirror 10 includes a glass substrate 12 formed from clear, float glass or, alternatively, tinted glass cut to the shape of an exterior rearview mirror, in this case, one adapted for use on the left side of a vehicle. Alternately, optically clear or tinted plastic substrate formed from polycarbonate, acrylic, polystyrene, allyl diglycol carbonate, styrene acrylonitrile, polysulfone and the like can be used. Preferably, glass substrate 12 has front (or first) and rear (or second) surfaces 12a, 12b which are generally parallel to each other although the invention certainly could be used on glass substrates having nonparallel surfaces forming prismatic elements typically used in day/night rearview mirror applications or on glass surfaces that are non-parallel for other reasons. A thin layer 14 of transparent, high index, dielectric material, preferably titania (titanium dioxide), is coated on the rear surface 12b of glass substrate 12 to a desired thickness. Thereafter, a very thin metallic layer 16, preferably of a high bulk reflectance metal such as aluminum or silver, is coated on the rear surface 14a of dielectric layer 14. Aluminum layer 16 is significantly thinner than prior known metallic layers used in mirror structures and has significant transparency as well as sufficient reflectance to operate in the present invention. A protective coating 18 of light absorbing material such as dark epoxy, urethane, acrylic or other paint or lacquer is applied over the rear surface 16a of metallic layer 16 such that it completely envelops, encloses, seals and protects layers 14, 16 and the rear surface of glass substrate 12, and overlaps the edges of substrate 12 as shown at 18a in FIG. 2.

Both the thin dielectric layer 14 and the very thin metallic layer 16 are preferably applied by vacuum deposition, specifically, magnetron sputtering. Alternately, processes such as dip-coating, pyrolytic spray deposition, chemical vapor deposition (CVD), thermal or electron beam evaporation, thermal or electron beam reactive evaporation, thermal or electron beam activated reactive evaporation, or spin coating processes can also be used, at least for the dielectric layer. Sputtering methods which are useful to provide the coatings of the present invention include post-magnetron sputtering, rotatable magnetron sputtering and diode or triode sputtering. In addition, cathodic arc deposition can also be used. CVD deposition may be a high pressure CVD, atmospheric pressure CVD, atmospheric pressure pyrosol CVD, low pressure CVD, or plasma assisted CVD.

In the case of the metallic aluminum layer 16, the aluminum may be vacuum deposited by evaporation or sputtering methods. In any event, specific coating techniques employed are not of great significance in the present invention as long as the proper parameters for the dielectric and metallic layers are provided.

With reference to the dielectric layer 14, the glass substrate is preferably coated with a high refractive index (n>2.0) thin film of sputtered, transparent titanium dioxide at a thickness of between about 500 and 700 angstroms, depending on the desired color and the exact refractive index of the titanium dioxide. The dielectric refractive index, its dispersion, and coating thickness will have some effect on the luminous reflectance, but for a good quality blue mirror, it is preferred that a refractive index of 2.4 be achieved with titanium dioxide at an optical thickness of about one-quarter of the wavelength of light in the visible wavelength region of the spectrum, namely, a titanium dioxide layer thickness of about 600 to 650 angstroms. The optical thickness of this layer is the product of the refractive index and the thickness. Thus, for a refractive index of 2.4 and a coating thickness of 600 angstroms the optical thickness is 1440 angstroms which is one quarter of a wavelength (5760 angstroms) of light that occurs in the yellow/red region of the visible spectrum. Such a coating of titanium dioxide does not have a light absorptivity sufficiently large to significantly attenuate light passing through the film. Although titanium dioxide has proven workable in the present invention, other dielectric layers would equally satisfy the requirements of the invention such as tantala, tungsten oxide and others as long as the refractive index and light absorptivity properties are met.

After application of the dielectric layer 14, the highly transparent layer of aluminum or silver metal 16 is applied over the dielectric layer. At low metallic layer thicknesses, luminous reflectance is low; however, the reflected spectrally selective color is strong and quite noticeable to the viewer. As the thickness of the metallic layer such as aluminum increases, spectral selectivity is retained with the mirror appearing blue in reflectance and the luminous reflectance rises and is near 50% at about 100 angstroms thickness of aluminum. Such thickness is the preferred thickness for mirror 10 shown in FIGS. 1 and 2 wherein the multi-layered coating is on the second surface of the transparent glass substrate 12. Such aluminum thickness yields excellent luminous reflectivity and color even though the aluminum is still highly transparent. As the aluminum layer thickness is increased beyond 100 angstroms, the luminous reflectance continues to rise; however, the spectral selectivity that provides the perceived blue color becomes more faint. Thus, the mirror begins to look more silvery than blue at higher thicknesses of the metallic layer.

The difficulty in simultaneously achieving the desired luminous reflectance level and appreciable spectral selectivity or blueness indicates why prior mirrors have not used a pure aluminum or silver metal deposited in a substantially opaque layer. Such mirrors will not provide the levels of luminous reflectance which are required to achieve the desired results in vehicles. Other known spectrally selective mirrors have not considered thinner thicknesses of metals such as aluminum or silver because of the substantial transparency which occurs with such thicknesses. Yet, it is precisely such transparency which allows the present invention to provide the desired luminous reflectance levels while meeting minimum reflectance standards. Indeed, several first surface spectrally selective mirrors use opaque or near opaque layers of metals like chromium (Cr) and titanium (Ti), and are commercially successful. However, for second surface spectrally selective mirrors, metals like chromium (Cr) and titanium (Ti) yield mirrors with luminous reflectances below minimum standards.

Figure 3:
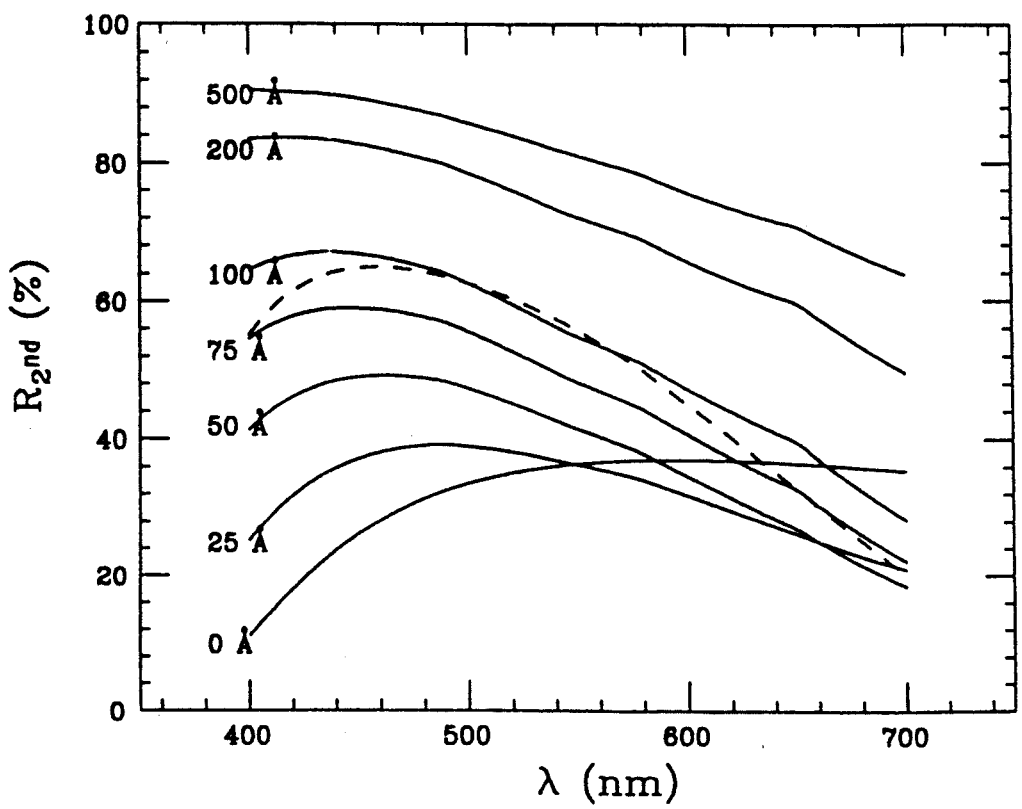
FIG. 3 is a graph of the spectral response for the mirror of the present invention using a 650 angstrom thick dielectric layer of titanium dioxide of refractive index 2.4 and various thicknesses of aluminum ranging from 0 to 500 angstroms.

In FIG. 3, the spectral response calculated for the mirror 10 of the present invention is shown wherein the mirror includes a dielectric layer 14 of titanium dioxide having a refractive index of about 2.4 and a coating thickness of 650 angstroms. Various thicknesses of aluminum layer 16 to the rear of such a dielectric layer 14 are shown in FIG. 3. The curve labeled 0 angstrom is for titanium dioxide on glass alone and shows little spectral selectivity and a low overall reflectance. For 25 angstroms of aluminum, a better spectral selectivity is provided where the reflectance peaks near 480 nanometers (nm) in the blue region of the spectrum and drops significantly toward the red end of the spectrum at about 700 nm. However, the overall reflectance for the 25 angstrom thick aluminum layer is only about 34% when measured using SAE recommended practice J964a, which uses Standard Illuminant A as source and a photopic or daytime adapted eye response detector. The 500 angstrom thick aluminum layer shown in FIG. 3 is opaque or nearly so, and provides a comparison for spectral selectivity and overall reflectance. The curve for 100 angstroms thickness of aluminum for layer 16 is preferred because it has a luminous reflectance of about 51.5%, well above the 35% required under known governmental standards. It also has an excellent spectral selectivity as shown by the higher reflectance at the blue portions (near 400 nm) as compared to the red portions (near 700 nm) of the spectrum. For comparison, FIG. 3 also shows a dashed curve which is computed for a commercially available blue mirror marketed by Donnelly Corporation of Holland, Mich. under the name "BLUE MIRROR" using a multi-layer coating having a nearly opaque metal layer therein. When the dashed curve is compared with the curve for the mirror of FIG. 3 at 100 angstroms thickness of aluminum, a very close match in optical response is demonstrated between the present invention and the commercially acceptable prior "BLUE MIRROR" mirror.

As will now be apparent, the metallic layer 16 formed from aluminum or silver can have a variety of thicknesses and yet satisfy the requirements that luminous mirror reflectance be above 35% and that there be consumer appreciable spectral selectivity such that the mirror appears blue. The 35% reflectance level is obtained with about 28 angstroms thickness of aluminum while spectral selectivity begins to be lost when about 133 angstroms thickness of aluminum is used. Depending on the type and properties of the dielectric layer 14, metal layer 16 and substrate 12, a metallic layer thickness range of between about 25 and 150 angstroms provides the desired qualities for the mirrors of this invention.

Figure 4:
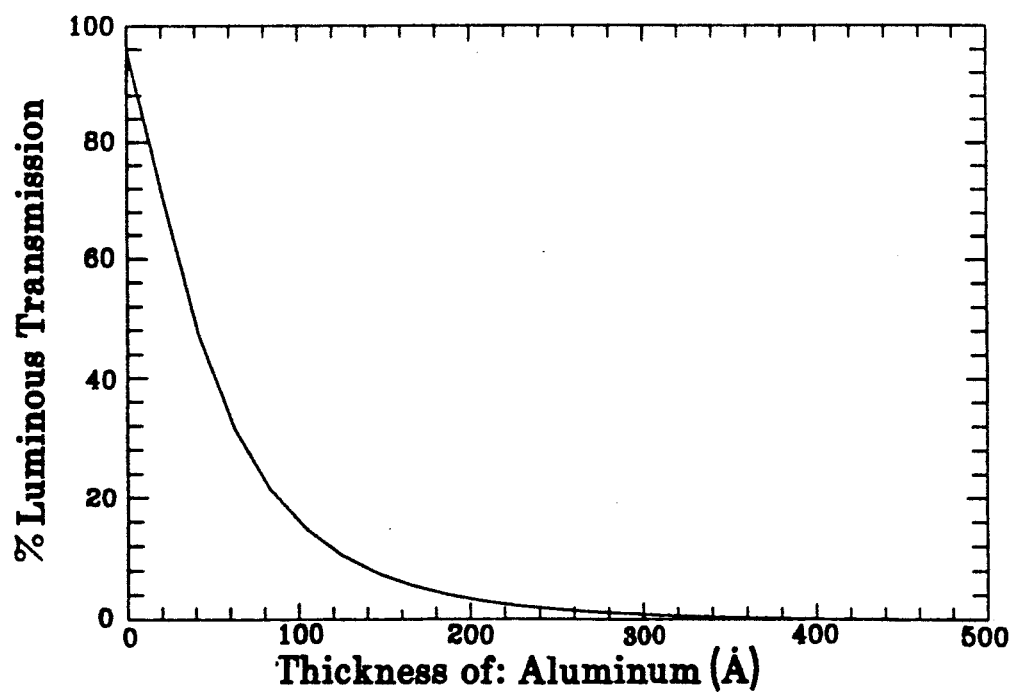
FIG. 4 is a graph of the luminous light transmittance of various thicknesses of aluminum between 0 and 500 angstroms on glass without any other coatings.

With reference to FIG. 4, the transparency of the various thicknesses of aluminum for the metallic layer of the present invention are shown by illustrating a calculation of the percent transmittance of light versus the thickness of aluminum between 0 and 500 angstroms on glass. As will be apparent from FIG. 4, a 25 angstrom thick aluminum layer on glass yields a luminous light transmittance of about 63%, an 80 angstrom thick aluminum layer yields a transmittance of about 22% while 133 angstroms thickness of aluminum on glass provides a transmittance of about 9%. The preferred thickness of about 100 angstroms aluminum on glass transmits about 16% of incident light which is relatively highly transparent.

The final layer 18 of protective, light absorbing material both protects layers 14 and 16 and absorbs light which is transmitted through the substrate 12, the dielectric layer 14, and the metallic layer 16. Since the desired luminous reflectance and spectral selectivity is achieved without this final layer 18 through the use of the dielectric and significantly transparent metallic layers, should light be transmitted through those various layers and reflected off something behind the mirror and returned toward the viewer, such returned light contributes to the overall mirror appearance, and the mirror function could thereby be compromised. Therefore, layer 18 provides an absorbing layer for all or most of the light transmitted through the various mirror layers, and preferably absorbs uniformly across all visible wavelengths of light. Alternately, layer 18 absorbs most transmitted light but selectively reflects light in the blue wavelength region. One material found suitable to provide such absorption characteristics while providing adequate protection from exposure of the mirror to moisture, salt spray and other environmental elements is black epoxy spray paint such as Rust Oleum black epoxy paint No. 7886 available from Rust Oleum Corp. of Vernon Hills, Ill. Protective, light absorbing layer 18 can be a paint or lacquer which can be applied by a variety of means including spraying, curtain-coating and roller-coating.

Using colored paints for layer 18 can also enhance the spectral selectivity of the mirror by additionally reflecting certain portions of the transmitted light back to the viewer. For example, a blue paint tends to make the mirror look bluer while a yellow paint tends to detract from the blue appearance. Therefore, selection of the paint is important for both the spectral selectivity and environmental protection. Blue paint such as Now (T.M.) spray paint royal blue No. 21207 available from Illinois Bronze Paint Co., Lake Zurich, Ill., or Rust Oleum Metal Saver (T.M.), blue sapphire No. 7884 can be used in place of the black enamel or epoxy paint.

Figure 5:
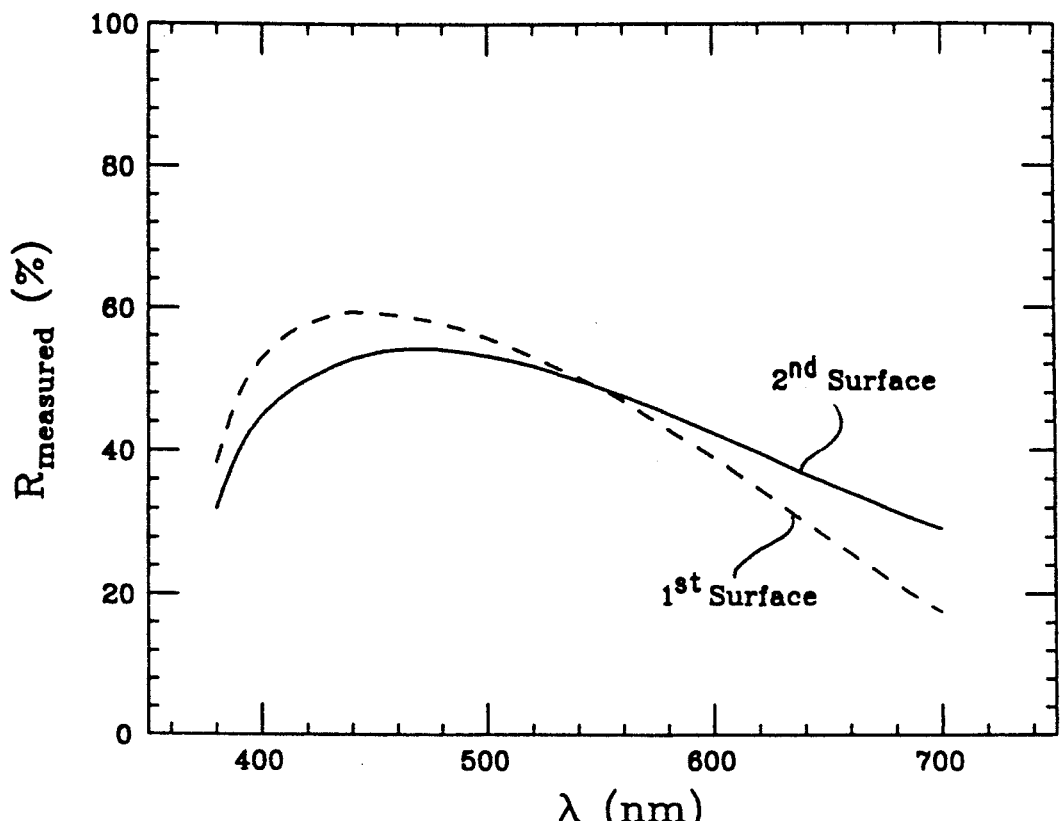
FIG. 5 is a graph of a comparison of the spectral reflectance of a commercially available, first surface blue mirror and the second surface mirror of FIG. 1 of the present invention in the visible regions of the spectrum.

With reference to FIG. 5, the graph shows the spectral reflectance of the mirror of the present invention as compared to the commercially available, first surface blue mirror described above in connection with FIG. 3. The dashed line curve represents the commercially available, first surface, blue mirror. The solid line represents mirror 10 of the present invention including a 600 angstrom thick layer of titanium dioxide having a refractive index of 2.4, and 100 angstrom thick layer of aluminum and a layer of Rust Oleum No. 7886 paint. Spectral selectivity is clearly evident by the difference in reflectance at 450 nm from that at 700 nm in both mirrors. Both mirrors appear blue in color and have luminous reflectances of 45.6% and 43.8%, respectively, which fall within the required range of 35% to 60%.

EXAMPLES

EXAMPLE 1

A first example of the mirror of the present invention was made using a piece of 0.093 inch thick soda-lime glass initially bent before coating to a 40 inch uniform radius to provide a substrate for a convex rearview mirror. Bending was carried out by heating the glass to a temperature exceeding 450° C. followed by bending to the desired radius in a conventionally designed bending mold. The bent glass was then cut to the shape of an outside rearview mirror shown in FIG. 1 herein.

After washing by conventionally known, standard glass substrate washing methods, the bent glass piece was placed in a vacuum sputter coater having both titanium and aluminum sputter cathodes mounted for use. With the glass positioned away from the deposition region, the titanium cathode was conditioned to operate in a reactive sputtering mode. The sputtering gas was pure oxygen at a pressure of 2.1 mTorr. When the cathode stabilized, the glass was passed underneath the sputter coater so as to produce a titanium dioxide coating of the thickness of about 600 angstroms within an accuracy of $+/-20$ angstroms. The titanium dioxide had a refractive index in the visible region of the spectrum of about 2.4 to 2.5, meaning that the 600 angstroms thickness corresponded approximately to a quarter wavelength optical thickness of light in the visible region of the spectrum.

The coated bent glass was then moved away from the cathode region again, while maintaining the vacuum in the coater and while shutting off the oxygen gas. The aluminum target was then conditioned to operate in the metallic deposition mode using inert argon as the non-reactive sputter gas at a pressure of 2 mTorr. Aluminum was then coated to a thickness of 100 angstroms within an accuracy of about $+/-20$ angstroms by passing the coated substrate beneath the aluminum cathode. The thicknesses of the films being coated in the sputter coater are adjusted by changing the substrate carrier speed.

After such vacuum deposition, the coated glass was removed from the sputter chamber and the coated side was sprayed with a flat black enamel spray paint such as Rust Oleum flat black spray enamel to provide a protective, light absorption coating. The paint was allowed to overlap the edges somewhat to provide extra protection from edge corrosion.

Figure 6:
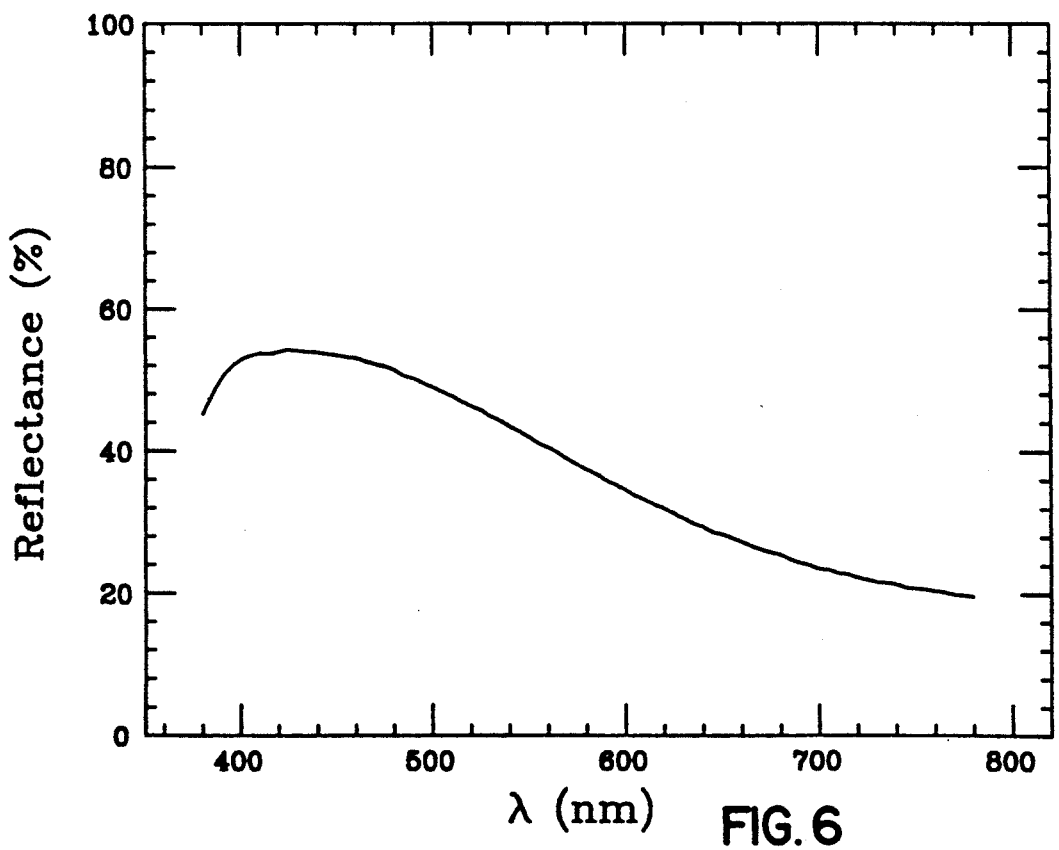
FIG. 6 is a graph of the spectral reflectance of the mirror of FIG. 1 having a titanium dioxide dielectric layer of 600 angstroms thickness and an aluminum layer of 100 angstroms thickness covered with a protective coating of flat black enamel spray paint on previously bent soda-lime glass.

With reference to FIG. 6, the spectral reflectance of the mirror of Example 1 is shown having a luminous reflectance (per SAE recommended practice J964a) of 38.6%. Spectral selectivity is illustrated by the peak in the reflectance at the shorter wavelengths between 400 and 450 nm in the blue visible portion of the spectrum as compared to the much reduced reflectance at the longer wavelengths in the red portion of the visible spectrum. The luminous reflectance is at a level acceptable for some automotive applications which require a blue, anti-dazzling, glare reducing exterior rearview mirror having greater than 35% luminous reflectance.

EXAMPLE 2

In a second example, the unique method of the present invention was used to overcome the manufacturing disadvantage of coating individual mirrors using the relatively slow rate of planar magnetron sputtering of titanium dioxide as a dielectric layer. Example 2 was manufactured by coating a large, flat glass sheet with a dielectric layer of titanium dioxide followed by bending the dielectric coated glass sheet to a desired uniform radius, multi-radius or non-uniform curvature or, alternatively, cutting the large, coated glass sheet to individual rearview mirror size followed by bending. By coating the flat glass sheet with titanium dioxide before bending, a more uniform thickness layer is achieved thereby providing a more precise blue mirror color which is principally dependent on the thickness of the titanium dioxide layer. Moreover, large sheets of glass may be coated with the titanium dioxide, then stored. As orders for mirrors are received, the glass may be left flat or bent as needed.

Specifically, in Example 2, a flat glass sheet of linear dimension 9.75 inches by 27 inches was first coated with titanium dioxide to a thickness of 600 angstroms using the sputter method set forth above in Example 1. The titanium dioxide coated glass was then heated and bent to a 40 inch radius curvature as also set forth above in Example 1. The bending required heating to a temperature in excess of 450° C. It was found that the heating changed the refractive index of the dielectric layer so little as to be insignificant. The coated, bent flat glass sheet was then cut to individual rearview mirror sizes followed by subsequent washing and sputter coating of the very thin metallic aluminum layer to a thickness of about 100 angstroms over top the sputter coated titanium dioxide layer. Metallic aluminum is significantly easier to sputter coat and achieves uniform thickness even though the coated glass substrate is curved or bent as compared to coating titanium dioxide on a bent glass substrate. Following coating of the coated glass with aluminum, the mirror was removed from the sputtering chamber and spray coated with black epoxy paint, namely, Rust Oleum No. 7886 gloss black epoxy spray paint to provide both light absorption and environmental protection.

Figure 7:
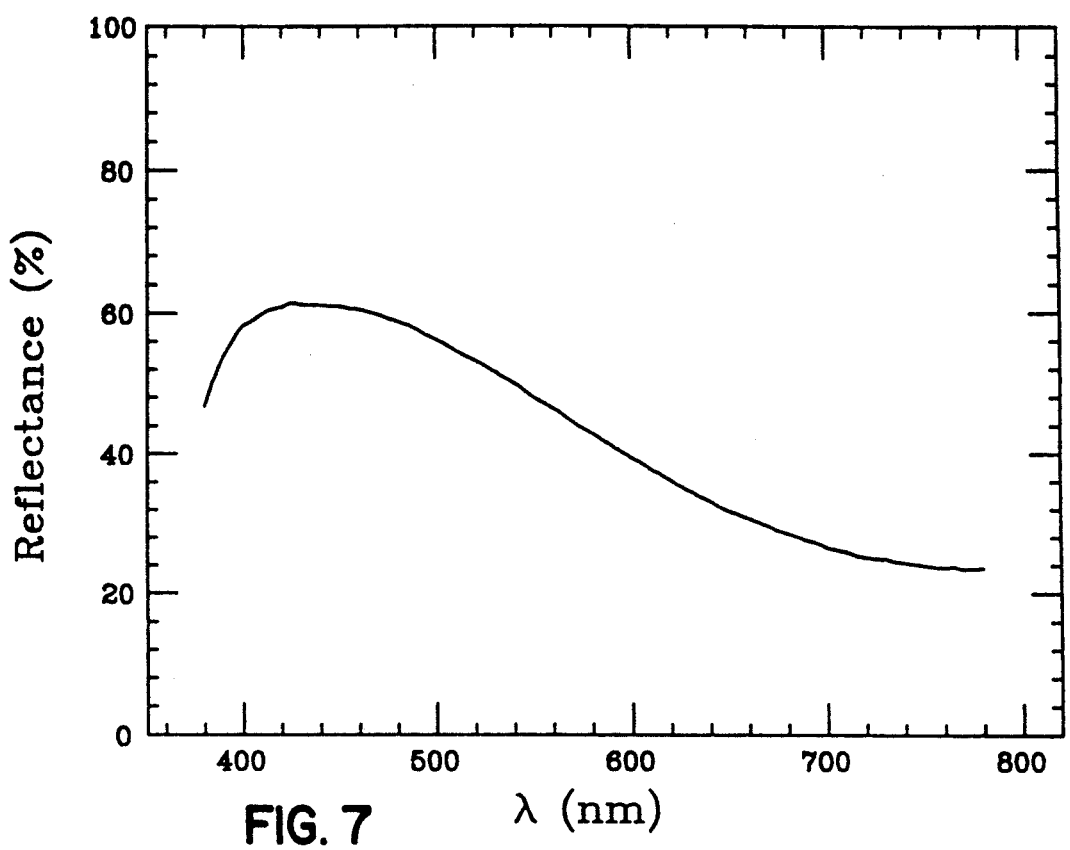
FIG. 7 is a graph of the spectral reflectance of a mirror of the present invention having a titanium dioxide dielectric layer of 600 angstroms thickness, a metallic aluminum layer of 100 angstroms thickness followed by a spray coating of black epoxy paint, the dielectric layer having been coated on flat sheet glass followed by heating, bending and the application of the metallic and paint layers thereafter in accordance with the method of the present invention.

The spectral reflectance of the mirror produced in Example 2 is shown in FIG. 7 and has a luminous reflectance of approximately 42.6% and again shows excellent spectral selectivity by enhancing reflectance in the blue visible regions of the spectrum while decreasing the reflectance in the longer red regions of the spectrum.

Typically, the driver-side mirror on automobiles is not curved but rather is flat. To produce these flat mirrors, the process outlined in Example 2 can be followed except that the glass is not bent. Such processing to produce flat or curved spectrally selective rearview mirrors has distinct advantages including economy of production of second surface mirrors such as is illustrated for mirror 10 in FIG. 1. Large areas of flat glass of 60"×60" or greater dimension can be coated with the dielectric layer 14. This can be achieved in a variety of coating means with high rate reactive sputtering in processes developed for economical coating of large glass areas being particularly suitable. Multiple cathodes can be used to increase throughput and, because only the one dielectric layer is being deposited at this stage of the manufacturing process, the coating conditions such as sputter rates and gas flows and compositions can be optimized without being concerned with deposition of the metal layer 16. Also, the substrate 12 can be heated without concern for degradation, modification or any other effect on the metal layer 16. By coating and then stocking large area glass sheets with the dielectric layer 14, subsequent cutting of mini-lites for bending or rearview mirror shapes for bending and/or continued processing while flat can be highly efficient with minimum cullet. If curved mirrors are desired, mini-lites or actual rearview shapes can be easily cut from the flat stock sheets using a variety of conventional cutting machines developed for cutting from flat glass sheets. Mini-lites or shapes to be bent are then sent through a bending process. Once the now bent or flat mini-lites or shapes have been so prepared, they can be coated with the thin metallic layer 16 in a process optimized for this purpose. After coating with metallic layer 16, protective coating 18 can be applied. Preferably, the dielectric coated glass sheet is shape-cut and metallic layer 16 is coated prior to applying protective coating 18 so that this protective coating can wrap-around, envelop, protect and seal the edge regions of the rearview mirror and so prevent environmental attack and edge corrosion.

The above method is particularly suited to in-line, sequential processing. Large glass sheets can be loaded onto a conveyor and washed in a glass cleaning unit that utilizes detergent-assisted face cleaning, clean, deionized water rinsing and drying using air knives. This cleaned glass can be loaded into an in-line sputter coater where about 650 angstroms of titanium dioxide is deposited using high rate reactive sputter deposition. Upon exiting this sputter chamber, the now dielectric coated large glass sheets are cut into mini-lites or into shapes. Those destined for bending are diverted to a bending process and return to the line in their bent form. The parts are next washed again and enter an aluminizing chamber where about 100 angstroms of aluminum is deposited. Upon exit from this aluminizing chamber, those parts in mini-lite form are cut to rearview mirror shapes. The now dielectric coated/aluminized shapes enter a curtain coater where the protective coating of black epoxy paint is applied. The shapes pass through a baking station and the final product is packed for customer use.

Other variations of the mirror of Example 2 were made using different light absorbing, protective coatings on the rear surface. For example, in one sample, Rust Oleum blue epoxy paint No. 7884 was used as a coating 18 while on a substantially identical mirror a black epoxy Rust Oleum paint No. 7886 was used. The aluminum and titanium dioxide thicknesses were the same on both mirrors. The resulting luminous reflectance and perceived colors of those two mirrors did not visibly distinguish one from the other. Thus, although there was no consumer appreciable effect from the substitution of this particular blue for the black paint, there was also no deleterious effect. Yet, when the black paint was replaced with a yellow glossy spray paint, namely, Rust Oleum No. 7744, the resulting mirror was yellow in reflectance due to the transparency of the 100 angstrom thickness aluminum layer. In this example, the titanium dioxide quarter wave coating could not provide sufficient blueness to overcome the strong yellow color from the paint. Hence, the mirror looked yellow.

In both Examples 1 and 2, the aluminum layer alone deposited on the glass yielded an 18% luminous transmittance corresponding to a thickness of about 95 to 100 angstroms according to FIG. 3 thereby agreeing with the design thickness calculated at 100 angstroms.

Figure 8:
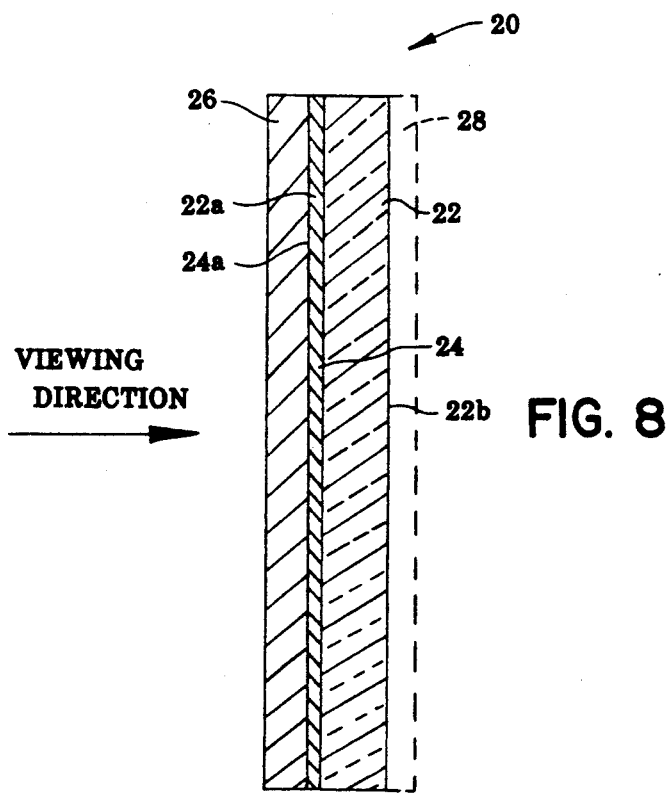
FIG. 8 is a sectional view of a second embodiment of the present invention incorporating a multi-layer first surface coating.
Figure 9:
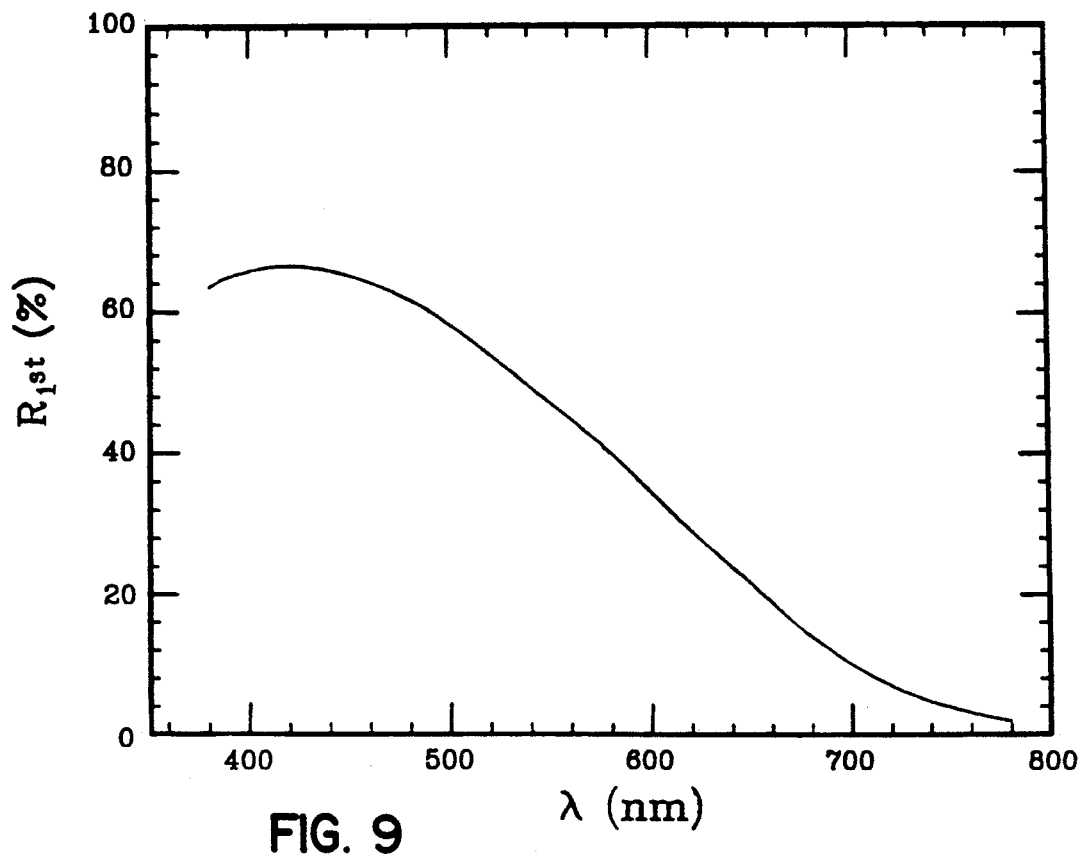
FIG. 9 is a graph of the spectral reflectance of the mirror of FIG. 8 incorporating a 600 angstrom thick dielectric layer of titanium dioxide, and an 80 angstrom thick layer of aluminum on the first surface of a glass substrate.
Figure 10:
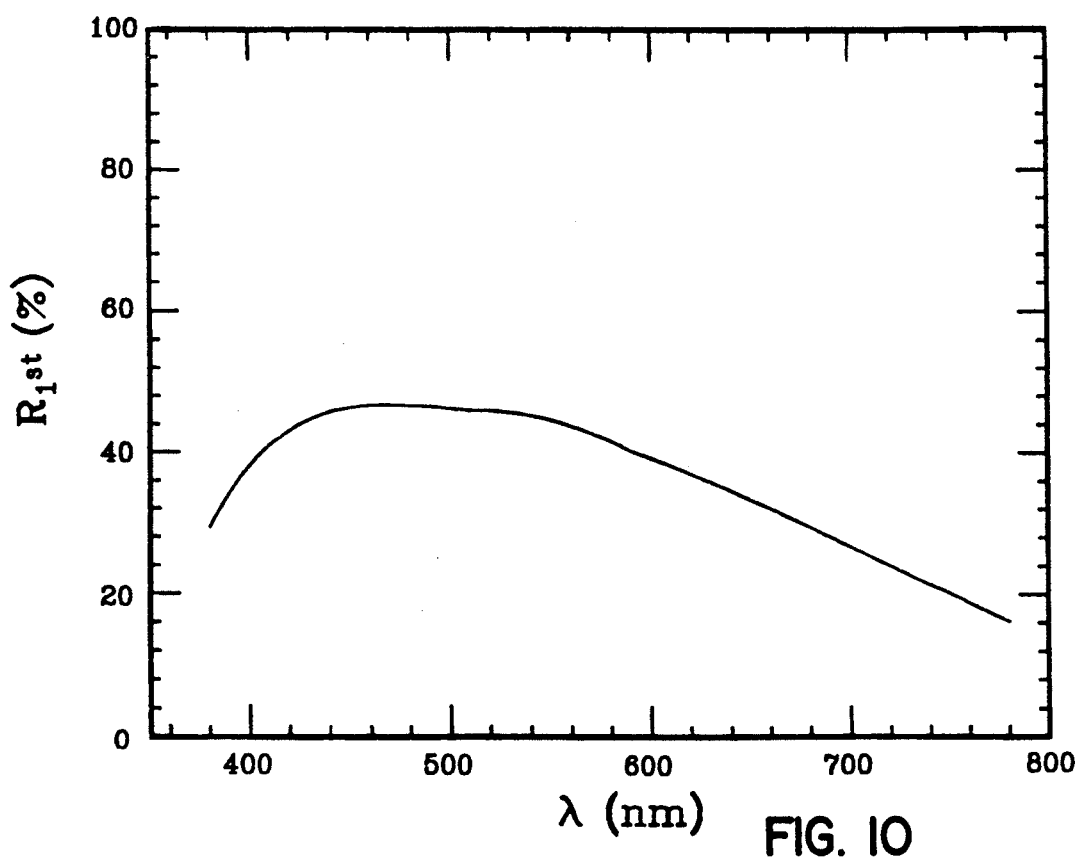
FIG. 10 is a graph of the spectral reflectance of a mirror like that of FIG. 8 having a 600 angstrom thick dielectric layer of titanium dioxide and a 79 angstrom thick layer of silver on the first surface of a glass substrate.

Referring now to FIGS. 8 through 10, a first surface embodiment 20 of the spectrally selective mirror of the present invention is illustrated. Mirror 20 includes a substrate 22 also having generally parallel front and rear surfaces but including a very thin metallic layer 24 coated on its front surface 22a. Applied over the front surface 24a of the metallic layer 24 is a thin layer 26 of dielectric material, preferably titanium dioxide. Dielectric layer 26 is thus the closest layer to the source of light to be reflected incident on the mirror as shown by the arrow in FIG. 8. In this form, if the substrate 22 is made from transparent glass or other material, it is preferred to incorporate a coating 28 of light absorbing material on the rear substrate surface 22b. Coating 28 is preferably black or blue epoxy paint as described above in connection with embodiment 10. When included, layer 28 absorbs most or all of the light that transmits through the dielectric and metallic layers 26 and 24 and into the glass substrate 22. Alternately, however, a highly absorbing opaque substrate may be substituted for substrate 22 such that light passing through layers 26 and 24 is absorbed by the substrate 22 without the necessity of including layer 28. For example, a black ceramic tile could be used.

In the first surface design of FIG. 8, metallic layer 24 is preferably formed from aluminum and has a thickness of about 80 angstroms which is somewhat less than the 100 angstrom preferred thickness for the second surface mirror of embodiment 10. The preferred titanium dioxide layer thickness of mirror 20 is 600 angstroms just as in embodiment 10.

The spectral selectivity and reflectance for mirror 20 of FIG. 8 is shown in FIG. 9 and includes a spectral reflectance exceeding 60% at 380 to 460 nm and near 2% at the longer wavelengths at 780 nm. Likewise, the luminous reflectance is 42% for 79 angstroms of aluminum.

The first surface mirror 20 of FIG. 8 provides a cost effective alternative to typical first surface spectrally selective mirrors using opaque or near opaque metal layer designs. The prior known opaque metal layer designs typically use chromium or titanium metals or special alloys of copper and aluminum, all of which are expensive and must be coated to thicknesses of several hundred angstroms. By contrast, first surface mirror 20 requires a fraction of such thicknesses for its metal layer and the material is less expensive since it is relatively common aluminum.

In place of the aluminum layer 24, other high bulk reflectance metals can be used. Again, such metals are typically deposited in substantially transparent layers generally in the range of 50 to 100 angstroms. For example, silver may be used typically in a thickness of 50 to 100 angstroms in such a first surface construction to provide a luminous reflectance of 39% to 46% of incident light. Silver does not provide as much spectral selectivity as aluminum. However, as shown in FIG. 10, a 79 angstrom silver layer thickness provides a spectral reflectance of about 16% at a wavelength of 780 nm and about 46% between 460 and 500 nm. The resulting luminous reflectance with silver as layer 24 is about 42% or very similar to that of the aluminum layered first surface embodiment. In each case, the dielectric layer was 600 angstroms thick and formed from titanium dioxide.

In order to provide a luminous reflectance for mirror 20 of at least 35% with good spectral selectivity, the thickness of aluminum metal layer 24 must be between about 40 and 115 angstroms. However, when silver is used, the limits are between about 25 and 135 angstroms. Such thicknesses for both metals are substantially transparent, i.e., not opaque and not near opaque.

Figure 11:
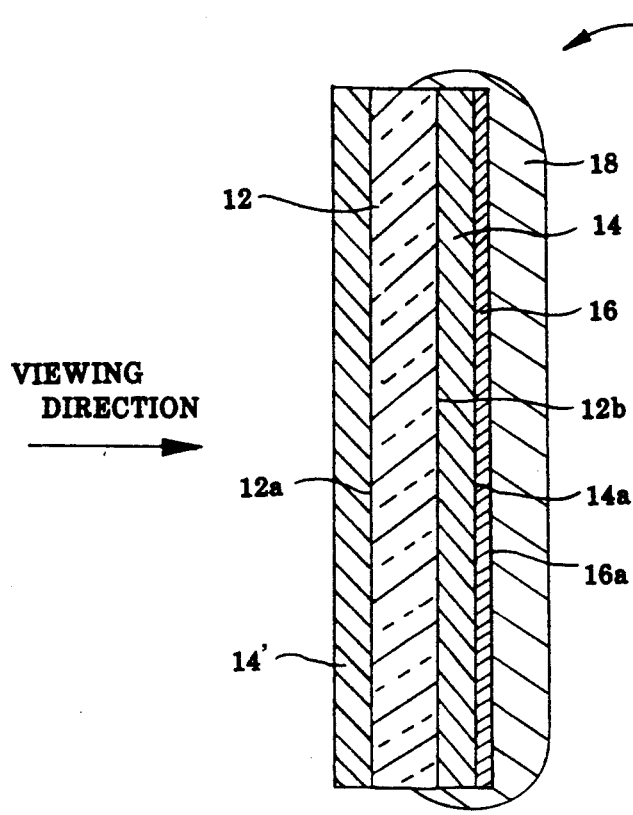
FIG. 11 is a sectional view of a third embodiment of the present invention incorporating two thin dielectric layers and a very thin metallic layer.

Although it is practical and preferable to use a single dielectric layer in combination with a single high transparency metallic layer to achieve the luminous reflectance and spectral selectivity properties of this invention, combinations of more than one dielectric with a single high transparency metallic layer are also possible. For example, FIG. 11 shows a mirror 10' where a second dielectric layer 14' is deposited onto the first (front) surface of substrate 12. Dielectric layers 14 and 14' are typically the same thickness and the same material. The spectral performance of a mirror formed according to the construction of FIG. 11 where layer 14 and 14' are 600 angstroms thick of titanium dioxide of refractive index about 2.4 and where layer 16 is a 100 angstrom thin film of aluminum is given in FIG. 12.

Figure 12:
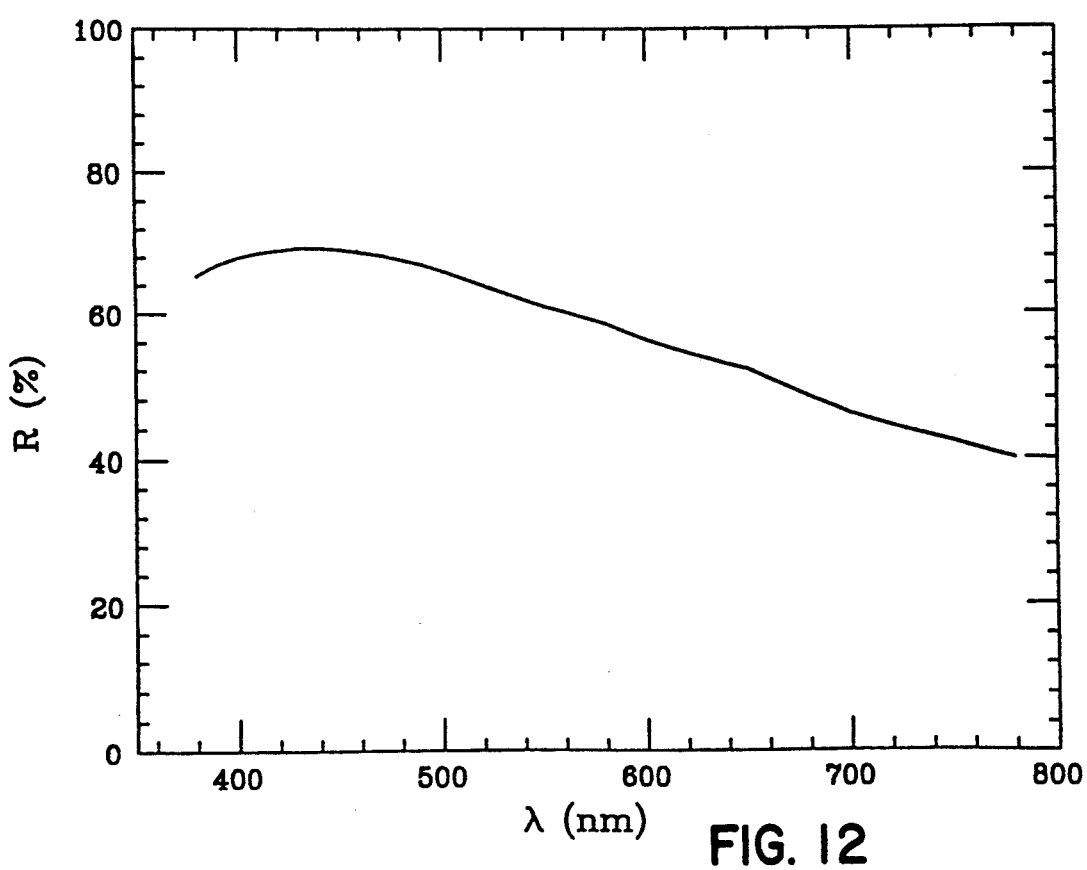
FIG. 12 is a graph of the spectral reflectance of the mirror of FIG. 11.

Manufacture of the mirror of FIGS. 11 and 12 is particularly economical if the titanium dioxide layers are deposited by the dip and fire technique wherein the substrate is dipped into a solution of an appropriate precursor of titanium dioxide dissolved in a suitable solvent. For example, a solution formed by dissolving titanium isopropoxide in ethanol can be used. Upon withdrawal from this solution, the solution evenly wets both surfaces, first and second, of the substrate. This coating on the first and second surfaces is then fired in an oven at 450° C., or thereabouts, to complete hydrolysis and condensation and to densify the newly formed oxide coating. If curved glass is desired, either the as dipped-coating or the dip/fire oxide coating can be bent in a conventional bending process. Once oxide coatings 14, 14' are so formed by this non-vacuum, dip/fire process, the thin metallic layer 16 can be deposited in a vacuum process as previously described.

Figure 13:
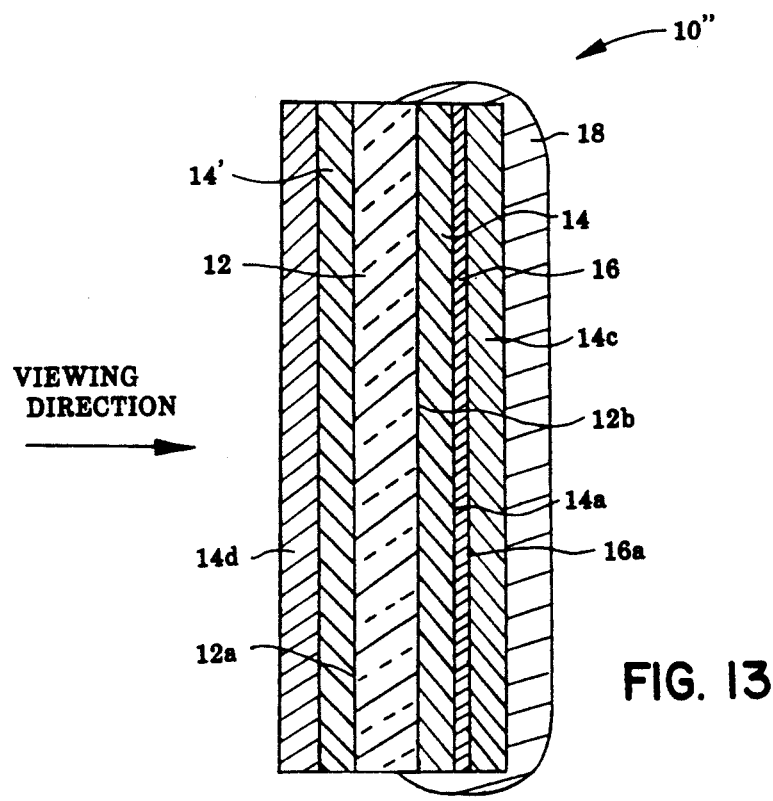
FIG. 13 is a sectional view of a fourth embodiment of the present invention incorporating four thin dielectric layers and a very thin metallic layer.

Alternately, a construction as shown in FIG. 13 can be used where, rather than using a single dielectric layer, the first and second surfaces of substrate 12 on mirror 10" are dip-coated with a two-layer stack 14, 14c and 14', 14d of a lower index/high index combination. Layers 14, 14' are first dip-coated as described above for mirror 10'. Thereafter, layers 14c, 14d are dip-coated from an appropriate precursor of silicon dioxide dissolved in a suitable solvent, i.e., ethanol. Mirror 10", from the front, consists of the following layers:

| 14d | 1000 angstroms | Silicon Dioxide of Refractive Index 1.45 |
| 14' | 600 angstroms | Titanium Dioxide of Refractive Index 2.4 |
| 12 | 0.093" | soda lime glass |
| 14 | 600 angstroms | Titanium Dioxide of Refractive Index 2.4 |
| 16 | 100 angstroms | Aluminum |
| 14c | 1000 angstroms | Silicon Dioxide of Refractive Index 1.45 |

Figure 14:
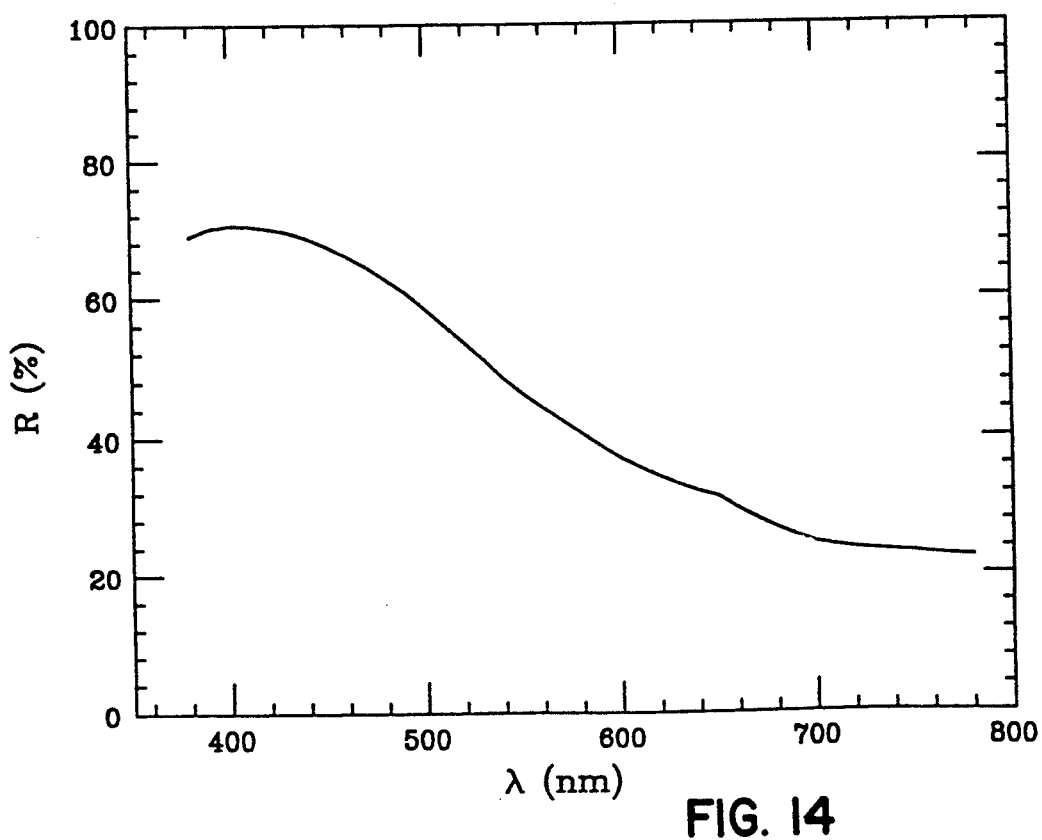
FIG. 14 is a graph of the spectral reflectance of the mirror of FIG. 13.

The spectral selectivity of this design, as illustrated in FIG. 14, is good.

The above examples demonstrate the potential value of using the dip-coating process, or of tailoring the spectral response of the coating by using a plurality of dielectric layers, albeit at the expense of manufacturing complexity.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A spectrally selective, glare-reducing mirror for vehicles comprising:
    a substrate having front and rear surfaces; and
    a multi-layer coating on said substrate including a thin layer of transparent, dielectric material and a very thin layer of metal, at least one of said metal and dielectric layers being applied directly to said substrate;
    said metal layer having a thickness within the range of between about 25 and 150 angstroms to provide substantial transparency along with significant reflectivity;
    said layer of dielectric material being positioned closer to a source of incident light to be reflected by said mirror than is said metal layer;
    whereby said mirror provides desired luminous reflectance at a level which reduces reflected glare while providing appreciable spectral selectivity in the reflected light.

2. The mirror of claim 1 wherein said substrate is transparent; said dielectric layer being applied to said rear substrate surface; said metal layer being applied over said dielectric layer to the rear of said substrate.

3. The mirror of claim 1 wherein said metal layer is applied to said front substrate surface; said dielectric being applied over said metal layer in front of said metal layer.

4. The mirror of claim 1, 2 or 3 wherein said metal layer is selected from the group including aluminum and silver.

5. The mirror of claim 1, 2 or 3 wherein said metal layer has a luminous light transmittance of between about 9% and 63%.

6. The mirror of claim 5 wherein said mirror has a luminous light reflectance of between about 35% and 60%.

7. The mirror of claim 3 wherein said metal layer is aluminum having a thickness of about 80 angstroms and a luminous light transmittance of about 22%; said mirror having a luminous reflectance greater than 35%.

8. The mirror of claim 7 wherein said dielectric layer has an index of refraction of at least 2.0 and has an optical thickness of one-quarter wavelength of light in the visible region.

9. The mirror of claim 8 wherein said dielectric layer is titanium dioxide, has an index of refraction of about 2.4, and an optical thickness of about 1440 angstroms.

10. The mirror of claim 8 wherein said substrate is transparent and includes a coating of light absorbing material on its rear surface.

11. The mirror of claim 8 wherein said substrate is opaque and highly light absorbing.

12. The mirror of claim 2 wherein said metal layer is aluminum having a thickness of about 100 angstroms and a luminous light transmittance of about 16%; said mirror having a luminous light reflectance greater than 35%.

13. The mirror of claim 12 wherein said dielectric layer is titanium dioxide, has an index of refraction of about 2.4, and a thickness of about 650 angstroms.

14. The mirror of claim 13 including a protective coating of light absorbing material over said metal layer, said light absorbing material absorbing light uniformly in all visible wavelengths and providing an environmental barrier to protect said multi-layer coating against moisture, salt and other elements encountered in vehicle driving.

15. The mirror of claim 1, 2 or 3 wherein said dielectric layer has an index of refraction greater than 2.0, has a light absorptivity which does not significantly attenuate light passing therethrough, and has an optical thickness of about one-quarter of the wavelength of visible light.

16. The mirror of claim 15 wherein said dielectric layer is titanium dioxide, has an index of refraction of about 2.4, and a thickness of about 650 angstroms.

17. The mirror of claim 15 wherein said dielectric layer is selected from the group including titanium dioxide, tantala and tungsten oxide.

18. The mirror of claim 2 including a protective coating of light absorbing material over said metal layer, said light absorbing material absorbing light uniformly in all visible wavelengths and providing an environmental barrier to protect said multi-layer coating against moisture, salt spray and other elements encountered in vehicle driving.

19. The mirror of claim 18 wherein said protective coating is a layer selected from the group including paint and lacquer.

20. The mirror of claim 19 wherein said protective coating layer has a color selected from the group including blue and black.

21. The mirror of claim 2 also including a second thin layer of dielectric material, said second layer being on said front substrate surface.

22. The mirror of claim 21 wherein said two layers of dielectric material are formed from the same material and have substantially the same thickness.

23. The mirror of claim 21 wherein said two layers of dielectric material are formed from titanium dioxide, each having a thickness of about 600 angstroms and a refractive index of about 2.4.

24. The mirror of claim 21 including third and fourth thin layers of dielectric material; said third layer being applied over and in front of said second dielectric layer; said fourth layer being applied over said metal layer to the rear thereof.

25. The mirror of claim 24 wherein said first two layers of dielectric material are formed from titanium dioxide, each having a thickness of about 600 angstroms and a refractive index of about 2.4; said third and fourth dielectric layers being formed from silicon dioxide, each having a thickness of about 1000 angstroms and a refractive index of about 1.45.

26. A spectrally selective, glare reducing mirror for vehicles comprising:
a transparent substrate having a first/front surface and a second/rear surface;
a thin layer of transparent, dielectric material on said second/rear substrate surface;
a very thin layer of metal on said thin layer of dielectric material; and
a protective coating of light absorbing material over said metal layer for absorbing light passing through said substrate, dielectric layer and metal layer and protecting said dielectric and metal layers against environmental effects;
said metal layer having a thickness within the range of between about 25 and 150 angstroms to provide substantial transparency along with significant reflectivity; said dielectric layer having an optical thickness of about one-quarter of the wavelength of light in the visible region of the spectrum; said mirror having a luminous reflectance of between about 35% and 60% of light incident on said first/front surface of said substrate;
whereby said mirror provides desired luminous reflectance at a level which reduces reflected glare while providing appreciable spectral selectivity in the reflected light.

27. The mirror of claim 26 wherein said dielectric layer has an index of refraction of greater than about 2.0 ($n \approx 2.0$).

28. The mirror of claim 27 wherein said dielectric layer is titanium dioxide, has an index of refraction of about 2.4, and a thickness of between 550 and 700 angstroms.

29. The mirror of claim 28 wherein said metal layer is aluminum having a thickness of about 100 angstroms and a light transmittance of about 16%; said mirror having a luminous light reflectance greater than 35%.

30. The mirror of claim 29 wherein said protective coating is a layer selected from the group including paint and lacquer; said coating enveloping and covering the edges of said thin dielectric and very thin metal layers.

31. The mirror of claim 30 wherein said substrate is glass.

32. The mirror of claim 26 wherein said metal layer is selected from the group including aluminum and silver.

33. The mirror of claim 32 wherein said metal layer has a light transmittance of between about 9% and 63%.

34. The mirror of claim 26 also including a second thin layer of dielectric material, said second layer being on said front substrate surface.

35. The mirror of claim 34 wherein said two layers of dielectric material are formed from titanium dioxide, each having a thickness of about 600 angstroms and a refractive index of about 2.4.

36. The mirror of claim 34 including third and fourth thin layers of dielectric material; said third layer being applied over and in front of said second dielectric layer; said fourth layer being applied over said metal layer to the rear thereof.

37. The mirror of claim 36 wherein said first two layers of dielectric material are formed from titanium dioxide, each having a thickness of about 600 angstroms and a refractive index of about 2.4; said third and fourth dielectric layers being formed from silicon dioxide, each having a thickness of about 1000 angstroms and a refractive index of about 1.45.

38. A method for manufacturing a spectrally selective, glare-reducing mirror for vehicles comprising the steps of:
1) providing a sheet of flat glass having front and rear surfaces;
2) coating one surface of said sheet with a thin layer of dielectric material of a desired thickness;
3) heating said coated glass to a temperature sufficient to allow bending of said coated glass;
4) bending said heated, coated glass to a desired curvature; and
5) coating said bent, coated glass over said layer of dielectric material with a very thin layer of metal having a thickness within the range of between about 25 and 150 angstroms.

39. The method of claim 38 wherein said dielectric coating step includes coating said sheet surface with titanium dioxide.

40. The method of claim 39 wherein said dielectric coating step further includes coating said titanium dioxide to a thickness of between about 500 to 700 angstroms.

41. The method of claim 40 wherein said metal coating step includes coating said dielectric layer with a layer of aluminum to a thickness of about 100 angstroms.

42. The method of claim 41 wherein said heating and bending steps include heating said dielectric coated glass to a temperature exceeding 450° C. followed by bending said heated, coated glass in a mold.

43. The method of claim 41 further including the step of cutting said bent, coated glass to the shape of a rearview mirror element.

44. The method of claim 38 or 43 further including the step of coating said very thin metal layer with a layer of light absorbing material.

45. The method of claim 38 wherein said dielectric coating step includes vacuum sputter coating said one sheet surface with titanium dioxide using a titanium cathode in an atmosphere of oxygen.

46. The method of claim 38 wherein said metal coating step includes coating said dielectric layer with a layer selected from aluminum and silver.

47. The method of claim 38 further including the step of coating said metal layer with a layer of protective material to resist degradation of said metal and dielectric layers from environmental effects.

48. The method of claim 38 wherein said coating with said dielectric material includes dipping said substrate in a solution including a precursor of said dielectric material dissolved in a solvent such that both said front surface and rear surface of said substrate are wetted with said solution; and firing said wetted substrate to a temperature sufficient to reduce said solution on said surfaces to an oxide forming said dielectric material.

49. The method of claim 38 wherein said coating steps are performed with in-line processing such that said coating steps occur in processing units which are sequentially positioned.

50. A method for manufacturing a spectrally selective, glare-reducing mirror for vehicles comprising the steps of:
   1) providing a sheet of flat glass having front and rear surfaces;
   2) coating one surface of said sheet with a thin layer of dielectric material of a desired thickness;
   3) coating said coated glass over said layer of dielectric material with a very thin layer of metal having a thickness within the range of between about 25 and 150 angstroms to provide substantial transparency along with significant reflectivity; and
   4) cutting said coated sheet into desired shapes useful as rearview mirrors for vehicles.

51. The method of claim 50 further including the step of coating said metal layer with a layer of protective material to resist degradation of said metal and dielectric layers from environmental effects.

52. The method of claim 50 wherein said step of coating of said one surface with said dielectric material includes dipping said substrate in a solution including a precursor of said dielectric material dissolved in a solvent such that both said front surface and rear surface of said substrate are wetted with said solution; and firing said wetted substrate to a temperature sufficient to reduce said solution on said surfaces to an oxide forming said dielectric material.

53. The method of claim 50 wherein said coating and cutting steps are performed with in-line processing such that said coating and cutting steps occur in processing units which are sequentially positioned.

* * * * *

UNITED STATES PATENT AND TRADEMARK OFFICE
CERTIFICATE OF CORRECTION

PATENT NO. : 5,179,471

DATED : January 12, 1993

INVENTOR(S) : Gregory T. Caskey et al.

It is certified that error appears in the above-identified patent and that said Letters Patent is hereby corrected as shown below:

Column 17, Claim 43, Line 18:
    "Claim 41" should be --Claim 42--.

Signed and Sealed this

Third Day of May, 1994

Attest:

BRUCE LEHMAN

Attesting Officer

Commissioner of Patents and Trademarks